United States Patent [19]
Ouchi et al.

[11] Patent Number: 6,064,396
[45] Date of Patent: *May 16, 2000

[54] TWO-STEP GAMMA CORRECTION METHOD AND SYSTEM

[75] Inventors: Shigeki Ouchi, Mutsuura-machi; Noboru Murayama, Machida; Koichi Suzuki, Yokohama, all of Japan

[73] Assignee: Ricoh Company, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/547,499

[22] Filed: Oct. 24, 1995

[30] Foreign Application Priority Data

Oct. 24, 1994 [JP] Japan ........................ 6-04952

[51] Int. Cl.⁷ .................................................. G06F 15/00
[52] U.S. Cl. ............................................................ 345/431
[58] Field of Search .................... 395/131, 150, 395/153; 345/431; 358/518, 521

[56] References Cited

U.S. PATENT DOCUMENTS 5,065,234  11/1991  Hung et al. .............................. 358/523
5,406,394  4/1995  Numakura et al. ...................... 358/518

FOREIGN PATENT DOCUMENTS 63-2462    1/1988  Japan .
6-105154   4/1994  Japan .

*Primary Examiner*—Phu K. Nguyen
*Attorney, Agent, or Firm*—Knoble & Yoshida LLC

[57] ABSTRACT

The current methods and systems for correcting image information improve input and output characteristics. Although γ correction curves have been used in prior art, the current invention allows more refined control in the correction process without additional parameters or hardware. The refined control includes adjustments at a localized area of the correction curve, an efficient conversion between a standard range value and a device-dependent value, a color-specific correction and a flexible user interface. Furthermore, the above described advantages are provided on demand rather than storing the pre-calculated information.

25 Claims, 15 Drawing Sheets c,d=-6~6; c=±3sqr(3),d=-c

TWO-STEP GAMMA CORRECTION METHOD AND SYSTEM

FIELD OF THE INVENTION

The current invention is generally related to methods and systems for correcting image information for inputting and outputting an image and more particularly related to methods and systems for correcting intensities based upon a modified gamma correction function according to the input and output characteristics.

BACKGROUND OF THE INVENTION

In the field of computer graphics, to compensate for input/output (I/O) characteristics, image information generally needs to be corrected. To input image information, a given input device such as a scanner has a particular set of input characteristics for red, green and blue (RGB). For example, certain scanners are more sensitive to a red input than a green input while certain other scanners do not have the above input characteristics. Due to these device dependent characteristics, the RGB image information scanned by one scanner would not be necessarily compatible with other RGB information inputted by another scanner. Similarly, to output an image information, a given printer has a particular set of output characteristics for cyan, magenta, yellow and black (CMYK), and due to these characteristics, the image information would not be compatible with other CMYK image information to be outputted by a different printer. Because of the above described device dependent characteristics, these input and output information are corrected so as to make them compatible between devices.

In addition to the above described I/O device dependent characteristics, color toner used by a printer also influences an image outputted on an image-carrying medium. In general, to render an image on a sheet of paper, four color toner including cyan, magenta, yellow and black are combined to output a specified color. However, due to the chemical composition, some color toner are not generally pure in their colors. In other words, as shown in FIG. 1, although the cyan toner has the strongest y output intensity in cyan for any given x input value, the cyan toner also has some magenta and yellow output intensities. Similarly, as shown in FIG. 2, the magenta toner is generally not pure and also renders some yellow and cyan when it is applied on an image-carrying medium. On the other hand, the yellow toner is substantially pure and renders insignificant cyan and magenta output intensities as shown in FIG. 3. Due to the above described color specific toner characteristics, when these three colors of toner are applied together, they do not render a uniform intensity as shown in FIG. 4. In order to fine tune the color balance in the output image, each of the above color toner outputs needs to be adjusted.

In order to correct the image information according to the above described characteristics of an I/O device as well as toner, a correction curve was used in prior art. A typical correction curve was generated by a function whose input and output values had predetermined ranges. The functions included gamma functions such as $y=x^\gamma$ where $\gamma$ is a selected constant, and both x and y range between 0 and 1. The range between 0 and 1 for the inputs or the outputs was correlated to 64 (6 bits) or 256 (8 bits) color intensity levels. For a given input value x, which might be a RGB value or a CMYK value, a particular corrected output value y was obtained based upon a predetermined function. However, this type of gamma correction functions was rather limited by a single constant parameter which generated a rather uniform curvature. Other prior art gamma functions involved polynomial equations as disclosed by Japanese Patent No 63-2462 and Japanese Patent No 6-105154.

Japanese Patent No 63-2462 discloses a method and a system of correcting image information by a series of adjustments to a curve generated by a polynomial such as a quadratic or cubic equation. The adjustments include a rotation of the curve by a predetermined angle $\theta$ about the origin and a shift of the rotated curve by a predetermined amount in either or both along the X and Y axes. Although these adjustments to the gamma correction curve provide some degree of flexibility, the total number of the parameters necessary for the correction is undesirably large. As a result, additional hardware such as registers and memory is required.

To reduce the number of parameters, Japanese Patent No. 6-105154 (the 154 reference) discloses a Murayama-Bezier (MB) curve as a gamma correction curve. The MB curve is expressed as follows:

$$y=cx(1-x)^2+(3-d)\ (1-x)x^2+x^3$$

where $0 \leq x \leq 1$. The curvature of the above MB curve is adjusted by a pair of parameters c and d. The parameter c determines the slope of a tangential line at the starting point (0,0) while the other parameter d determines the slope of a tangential line at the ending point (1,1).

In addition to the above described two-parameter adjustment, the 154 reference also discloses the four-parameter adjustment. For a specified x value, without changing the curvatures specified by c and d (here expressed as $c_1$ and $d_1$), the above MB curve is further adjusted by another pair of parameters $c_2$ and $d_2$, which are defined as follows: $c=c_1+C_2\ (1-x)\ x$ and $d=d_1+d_2\ (1-x)\ x$. Thus, at a point specified by a x value, the curve is further modified in the y direction without modifying the above described original starting and ending slopes of the curve specified by $c_1$ and $d_1$.

In general, due to the complex nature of the corrections, the above described correction has been performed using pre-calculated tables. Since the correction process requires complex equations and a number of parameters, it is impractical to calculate the correction data on the fly during its correction process. Although the pre-calculated table look-up process is more efficient, it is rather limited and lacking flexibility in correcting image information. Furthermore, to handle a large number of variations in the device as well as toner characteristics for a wide range of input and output values, a voluminous amount of pre-calculated data needs to be stored in the table memory. The amount of pre-calculated data is even larger when each color in a color system is independently corrected.

In the relevant prior art of color production technologies involving fax machines, copiers and printers, the image information has been generally corrected based upon the above described input or output characteristics using pre-calculated tables. This is because the prior art correction process is too complex to be performed on the fly or requires additional hardware. The correction process remains to be more efficient so that it is performed on the fly without the use of pre-calculated table.

In the relevant prior art, let alone, the color specific correction of the image information had not been performed. In general, all color components had been uniformly adjusted for the overall darkness or lightness of an outputted image. To allow the color specific adjustments of the image information, the correction process remains to be accomplished in a more efficient manner without sacrificing the system performance or without additional hardware. However, the color specific correction must be sufficiently flexible so that it can accommodate subtle color changes.

SUMMARY OF THE INVENTION

To solve the above and other problems, one of the objectives of the current invention is to provide a method and a system which allow an efficient conversion based upon a gamma correction curve without limiting the number of output levels.

In the above described conversion method and system, the second objective of the current invention is to accomplish the gamma correction with a predetermined small number of parameters.

In addition, in the above described conversion method and system, the third objective of the current invention is to allow locally refined adjustments of the gamma correction curve without changing the predetermined initial and ending curvatures.

The above described objectives of the current invention are also combined with the fourth objective to allow storing of the above described gamma correction conversion and the associated parameter sets for the future use.

In order to achieve the above and other objects, according to one aspect of the current invention, a method of converting color information from one color system to another color system for outputting a color image includes the steps of: a) converting first values respectively representing a first set of colors into second values respectively representing a second set of colors based upon a common function; and b) further converting each of the second values into an adjusted second value based upon a color specific function, the adjusted second value enhancing the output image on an image carrying medium.

According to a second aspect of the current invention, a method of generating an intensity conversion table on the fly based upon a correction function for outputting an image includes the steps of: a) obtaining an intensity output value y for an input value x based upon a gamma correction function, the gamma correction function being expressed by $y=f(x)$, x and y satisfying the following conditions, $0 \leq x \leq 1$ and $0 \leq y \leq 1$; and b) further modifying the intensity output value y to y' based upon a second equation $y'=a+b\cdot y$ where $y'=a$ when $x=0$ and $y'=a+b$ when $x=1$.

According to a third aspect of the current invention, A method of generating an intensity conversion table on the fly based upon a correction function for outputting an image includes the steps of: a) providing an intensity input value x; b) converting the intensity input value x into an intensity output value y based upon a gamma correction function, the gamma correction function being expressed by an equation, $y=c(x-1)^2x+(3-d)(x-1)x^2+x^3$, where x is an input variable having particular values $x_1$, $x_2$, $x_3$, $x_4$ and $x_5$ and $x_1<x_2<x_3<x_4<x_5$ ($x_1=0$, $x_5=1$) while y is an output variable having corresponding particular values $y_1$, $y_2$, $y_3$, $y_4$ and $y_5$ ($y_1=0$, $y_5=1$), c and d being a constant and defined by $c=c_1+C_2(x-x_2)(x-x_4)$, $d=d_1+d_2(x-x_2)(x-x_4)$ where $$c_1 = \frac{x_2 x_4}{(1-x_2)(1-x_4)} + \frac{-y_2(1-x_4)x_4^2 + y_4(1-x_2)x_2^2}{x_2 x_4 (1-x_2)(1-x_4)(x_2-x_4)}$$

$$d_1 = 3 + \frac{x_2+x_4-x_2 x_4}{(1-x_2)(1-x_4)} + \frac{-y_2(1-x_4)^2 x_4 + y_4(1-x_2)^2 x_2}{x_2 x_4 (1-x_2)(1-x_4)(x_2-x_4)}$$

-continued $$c_2 - d_2 = \frac{y_3}{(x_3-x_2)(x_3-x_4)(1-x_3)^2 x_3} - \frac{c_1}{(x_3-x_2)(x_3-x_4)} - \frac{(3-d_1)x_3}{(x_3-x_2)(x_3-x_4)(1-x_3)} - \frac{x_3^2}{(x_3-x_2)(x_3-x_4)(1-x_3)^2}$$

y satisfying the following condition, $0 \leq y \leq 1$; and c) further modifying the intensity output value y to y' based upon a second equation $y'=a+b\cdot y$ where $y'=a$ when $x=0$ and $y'=a+b$ when $x=1$.

According to a fourth aspect of the current invention, a system for converting color information from one color system to another color system for outputting a color image includes: a first converter for converting first values respectively representing a first set of colors into second values respectively representing a second set of colors based upon a common function; and a second converter connected to the first converter for further converting each of the second values into an adjusted second value based upon a color specific function, the adjusted second value enhancing the output image on an image carrying medium.

According to a fifth aspect of the current invention, a system for generating an intensity conversion table on the fly based upon a correction function for outputting an image includes: a first adjuster for obtaining an intensity output value y for an input value x based upon a gamma correction function, the gamma correction function being expressed by $y=f(x)$, x and y satisfying the following conditions, $0 \leq x \leq 1$ and $0 \leq y \leq 1$; and a second adjuster in response to the intensity output value y for further modifying the intensity output value y to y' based upon a second equation $y'=a+b\cdot y$ where $y'=a$ when $x=0$ and $y'=a+b$ when $x=1$.

According to a sixth aspect of the current invention, a system for generating an intensity conversion table on the fly based upon a correction function for outputting an image, includes: a scanner for inputting an intensity input value x of an image; a first converter for converting the intensity input value x into an intensity output value y based upon a gamma correction function, the gamma correction function being expressed by an equation, $y=c(x-1)^2x+(3-d)(x-1)x^2+x^3$, where x is an input variable having particular values $x_1$, $x_2$, $x_3$, $x_4$ and $x_5$ and $x_1<x_2<x_3<x_4<x_5$ ($x_1=0$, $x_5=1$) while y is an output variable having corresponding particular values $y_1$, $y_2$, $y_3$, $y_4$ and $y_5$ ($y_1=0$, $y_5=1$), c and d being a constant and defined by $C=C_1+C_2(x-x_2)(x-x_4)$, $d=d_1+d_2(x-x_2)(x-x_4)$ where $$c_1 = \frac{x_2 x_4}{(1-x_2)(1-x_4)} + \frac{-y_2(1-x_4)x_4^2 + y_4(1-x_2)x_2^2}{x_2 x_4 (1-x_2)(1-x_4)(x_2-x_4)}$$

$$d_1 = 3 + \frac{x_2+x_4-x_2 x_4}{(1-x_2)(1-x_4)} + \frac{-y_2(1-x_4)^2 x_4 + y_4(1-x_2)^2 x_2}{x_2 x_4 (1-x_2)(1-x_4)(x_2-x_4)}$$

$$c_2 - d_2 = \frac{y_3}{(x_3-x_2)(x_3-x_4)(1-x_3)^2 x_3} - \frac{c_1}{(x_3-x_2)(x_3-x_4)} - \frac{(3-d_1)x_3}{(x_3-x_2)(x_3-x_4)(1-x_3)} - \frac{x_3^2}{(x_3-x_2)(x_3-x_4)(1-x_3)^2}$$

; and a second converter for further modifying the intensity output value y to y' based upon a second equation $y'=a+b\cdot y$ where $y'=a$ when $x=0$ and $y'=a+b$ when $x=1$.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 5:
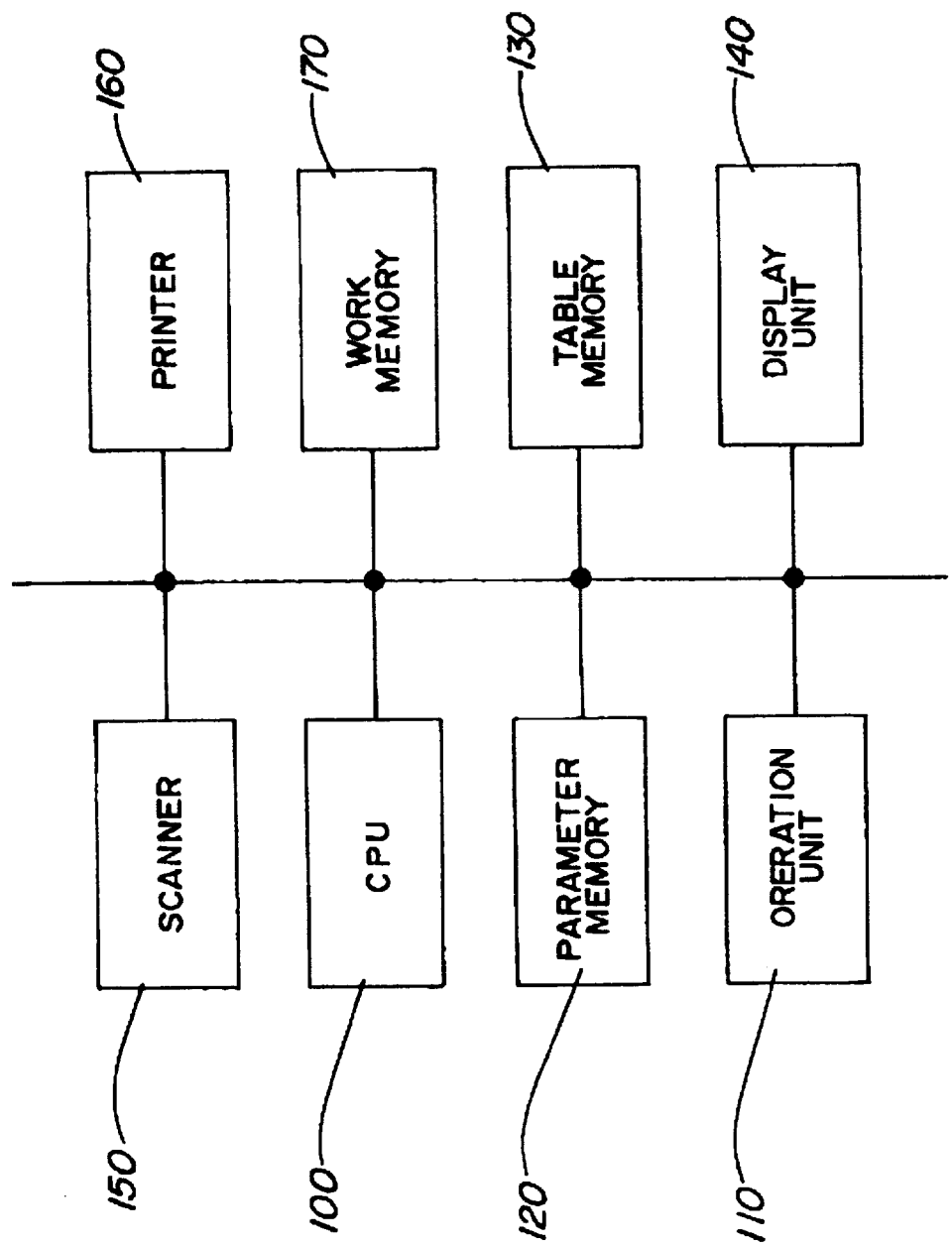
FIG. 5 illustrates a block diagram of one embodiment of the system according to the current invention.

Referring now to the drawings, wherein like reference numerals designate corresponding structure throughout the views, and referring in particular to FIG. 5, one preferred embodiment of the system of correcting image information according to the current invention includes a scanner 150 as an input device, a central processing unit (CPU) 100, parameter memory 120, an operation unit 110, a printer 160 as an output device, work memory 170, table memory 130, and a display unit 140. These components of the system are connected with each other. The scanner 150 inputs image information into the system. The CPU 100 runs a predetermined program in work memory 170 so as to correct the inputted image information to a desired output image information based upon a predetermined function such as a γ correction function. During the above correction process, certain parameters are used for the function, and they are stored in parameter memory 120. The corrected image information and its associated parameter set may be stored in table memory 130 for the future repeated use. Among other things, to decide which parameters are used or which corrected image information is to be stored, an operation unit 110 such as a key board controls certain user interactions via a display unit 140 such as a display terminal. Finally, the corrected image information is outputted on an image-carrying medium via an output device such as a printer 160. However, according to another embodiment of the current invention, the output device is not limited to the printer 160 and includes a communication device or line for transmitting the corrected image information to a remote site. By the same token, an input device is not limited to a scanner 150, and the current system can be combined with other input devices including a memory storage device such as a disk drive as well as a communication line or device such a facsimile machine.

Still referring to FIG. 5, the software program corrects the inputted image information on the fly based upon on a predetermined function without the use of a look-up table. In addition, the software program fine tunes the corrected image information based on a color specific function without the use of a look-up table. The above correction processes and in particular, the gamma function are later described in detail below with respect to FIGS. 7–15. Certain aspects of the software program are involved in the control of the above described user interface operations. To allow the operation unit 110 to offer choices for the parameter selection, the software program interacts with the operation unit 110 and the display unit 140. Certain other aspects of the software program are involved in the storage of the corrected image information in the table memory 130.

Figure 6:
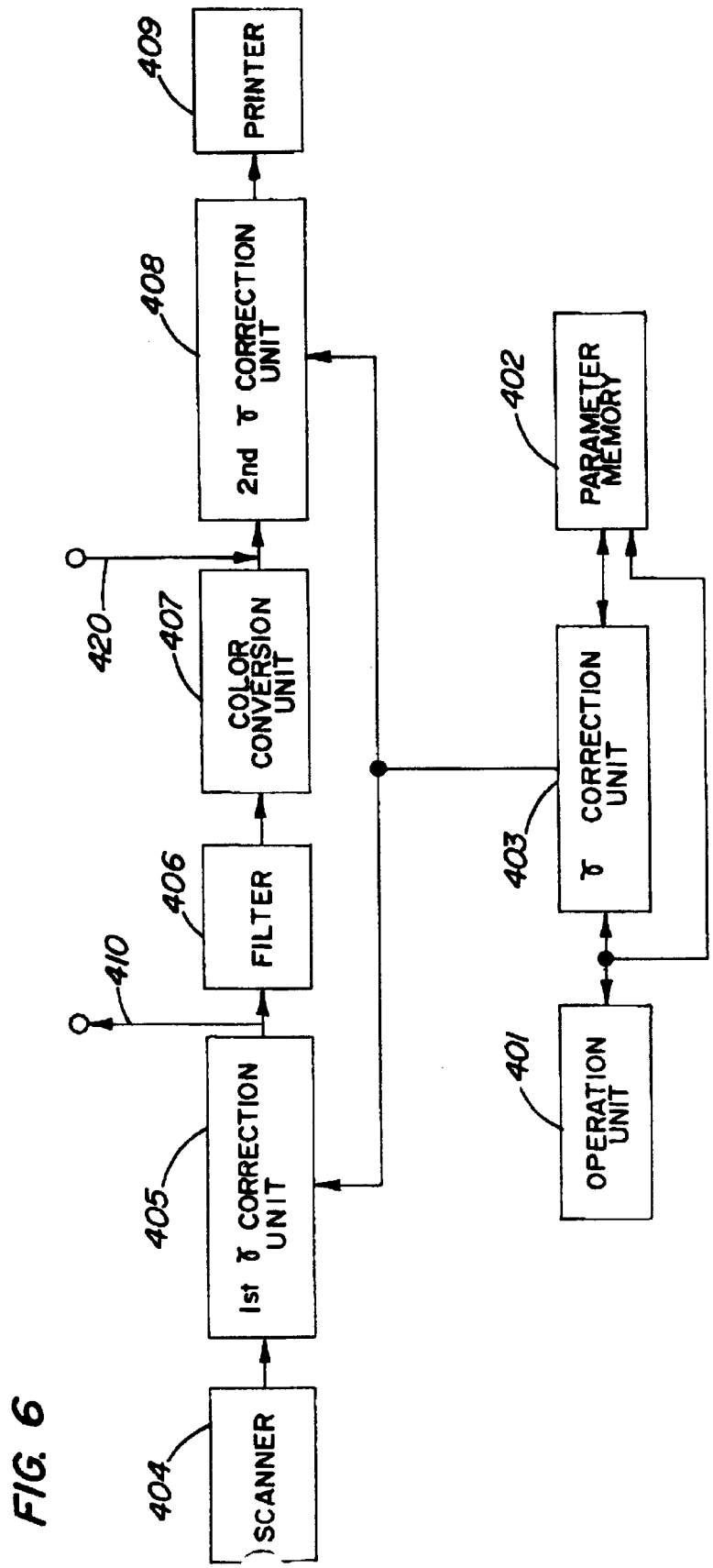
FIG. 6 illustrates a diagram of another embodiment of the system according to the current invention.

Referring to FIG. 6, another preferred embodiment of the system according to the current invention includes a scanner 404 for inputting image information, a γ correction unit 403 for correcting the input image, an operation unit 401 to control the γ correction unit 403, parameter memory 402 for storing parameters, a filter 406, a color conversion unit 407, and a printer 409 for outputting the corrected image information. The γ correction unit 403 further includes a first γ correction unit 405 for correcting the scanned image information and a second γ correction unit 408 for further correcting the output of the first γ correction unit 401.

Still referring to FIG. 6, in general, the first correction unit 405 corrects the input characteristics of the scanner and standardizes the input into a predetermined range such as between 0 and 1. Such corrected and standardized color values originally inputted by the scanner 401 are often in the Red-Green-Blue (RGB) color scheme. The standardized and corrected output from the first γ correction unit 405 may be stored in a predetermined storage location as indicated by an arrow 410. Such image information is input-device independent and can be retrieved from the predetermined storage location via line 420.

To output such color information via the printer 409, if the color information is in the RGB scheme and the printer is in the CMYK scheme, the color conversion unit 407 must convert the standardized and corrected color RGB values into the CMYK scheme. In general, an output device such as the printer 409 uses the CMYK scheme, and during the conversion, cyan absorbs red, magenta absorbs green and yellow absorbs blue.

Figure 1:
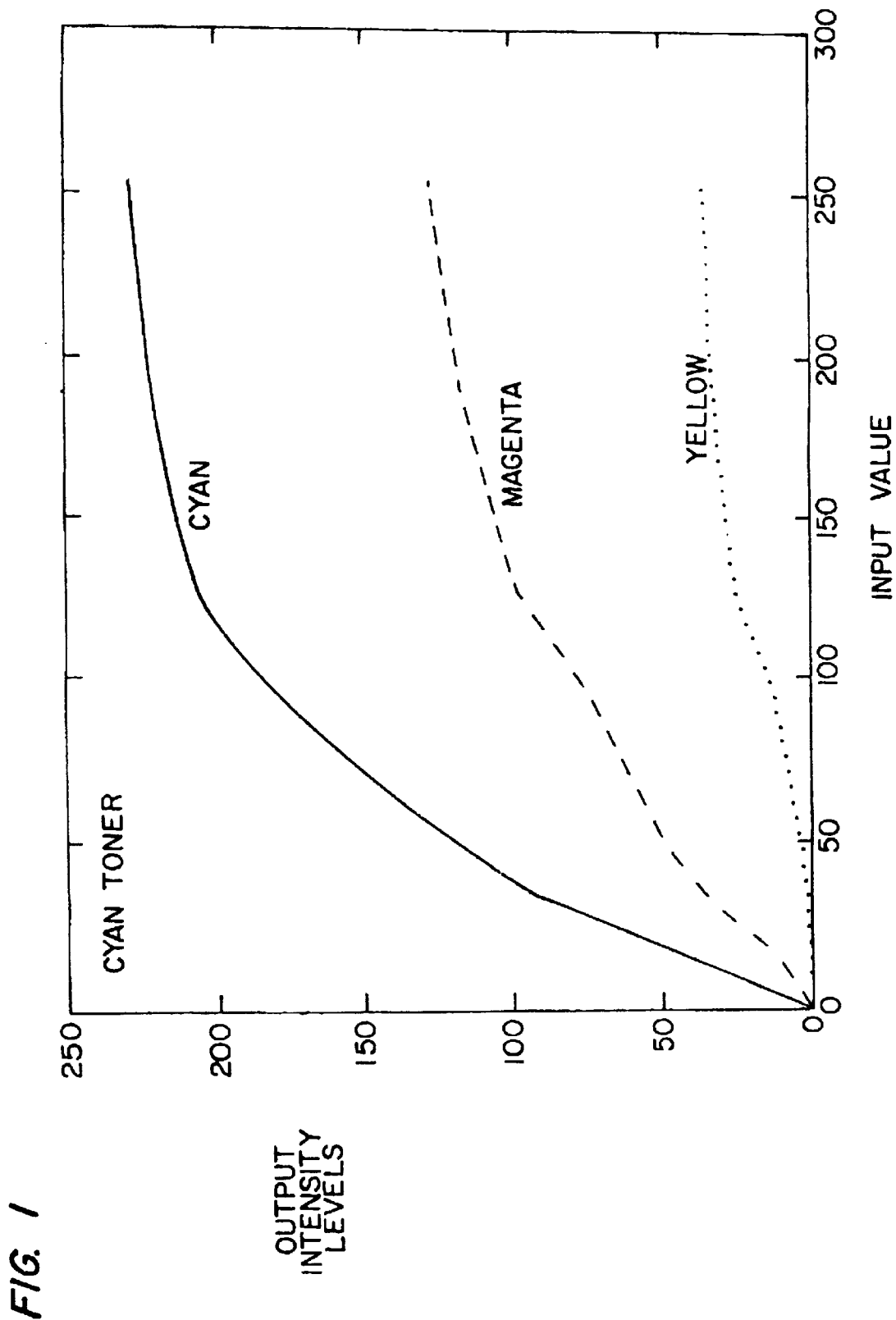
FIG. 1 is a graph illustrating a general relation between input values and output intensity values for cyan, magenta and yellow components of cyan toner.
Figure 2:
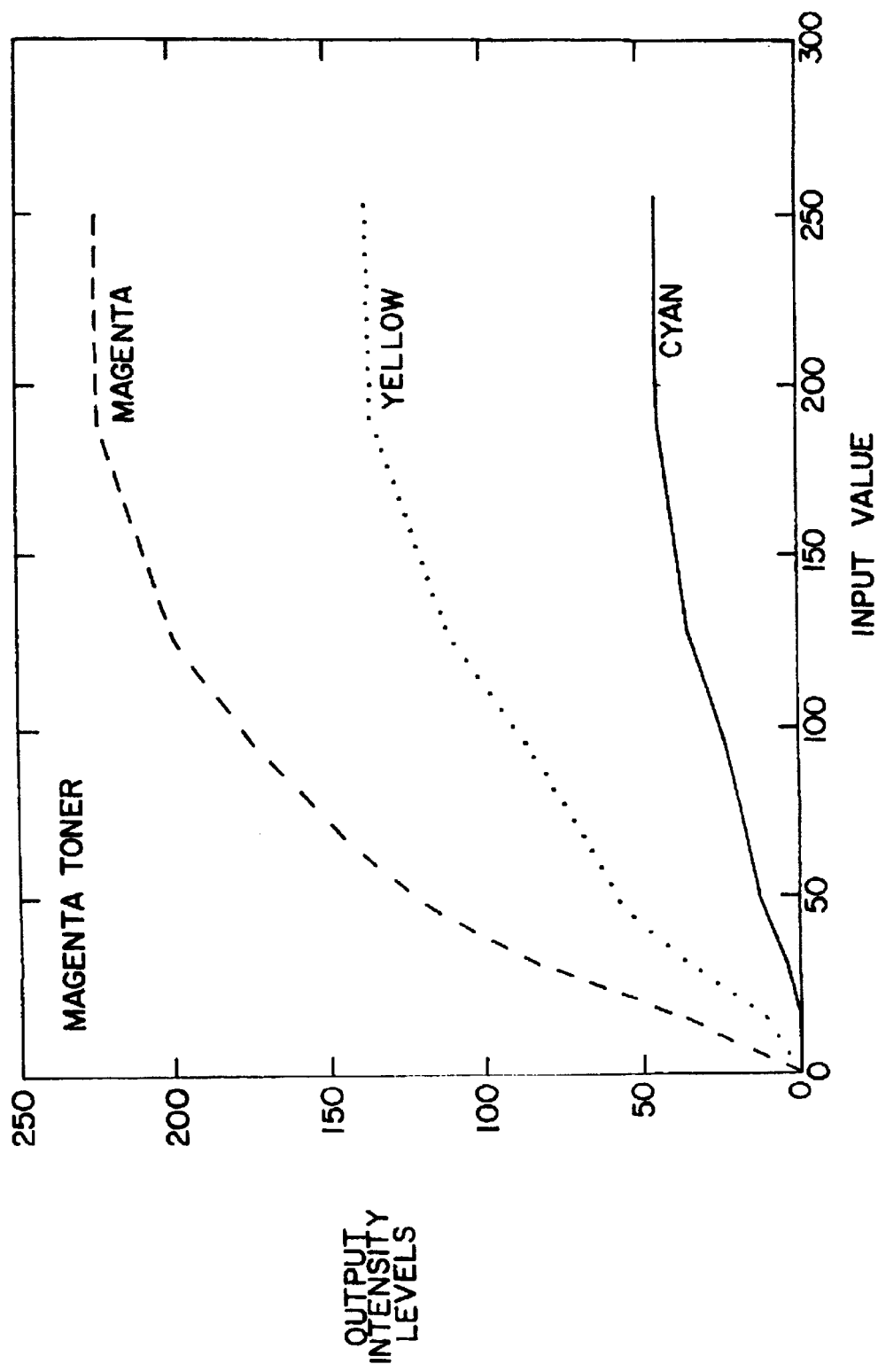
FIG. 2 is a graph illustrating a general relation between input values and output intensity values for cyan, magenta and yellow components of magenta toner.
Figure 3:
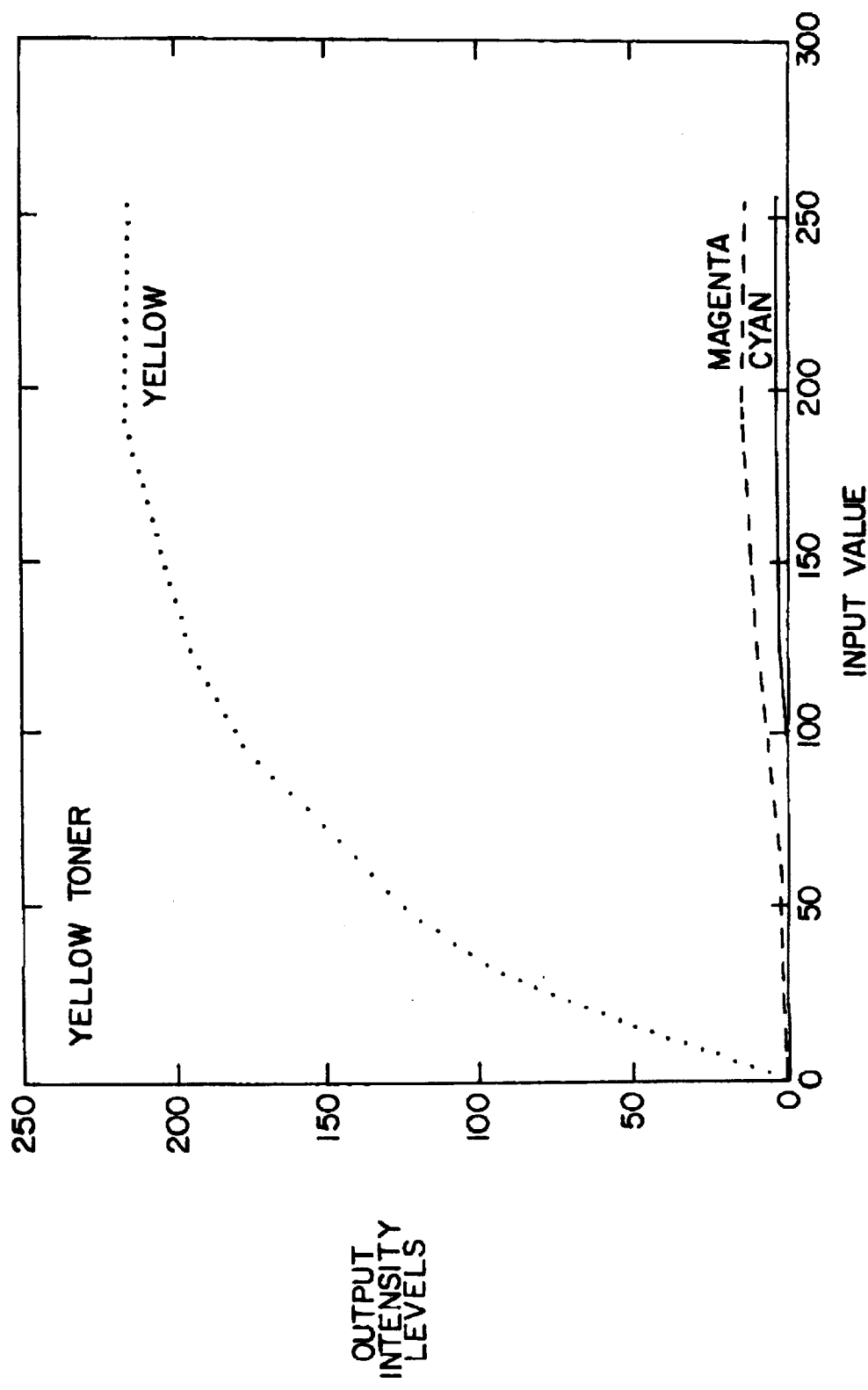
FIG. 3 is a graph illustrating a general relation between input values and output intensity values for cyan, magenta and yellow components of yellow toner.
Figure 4:
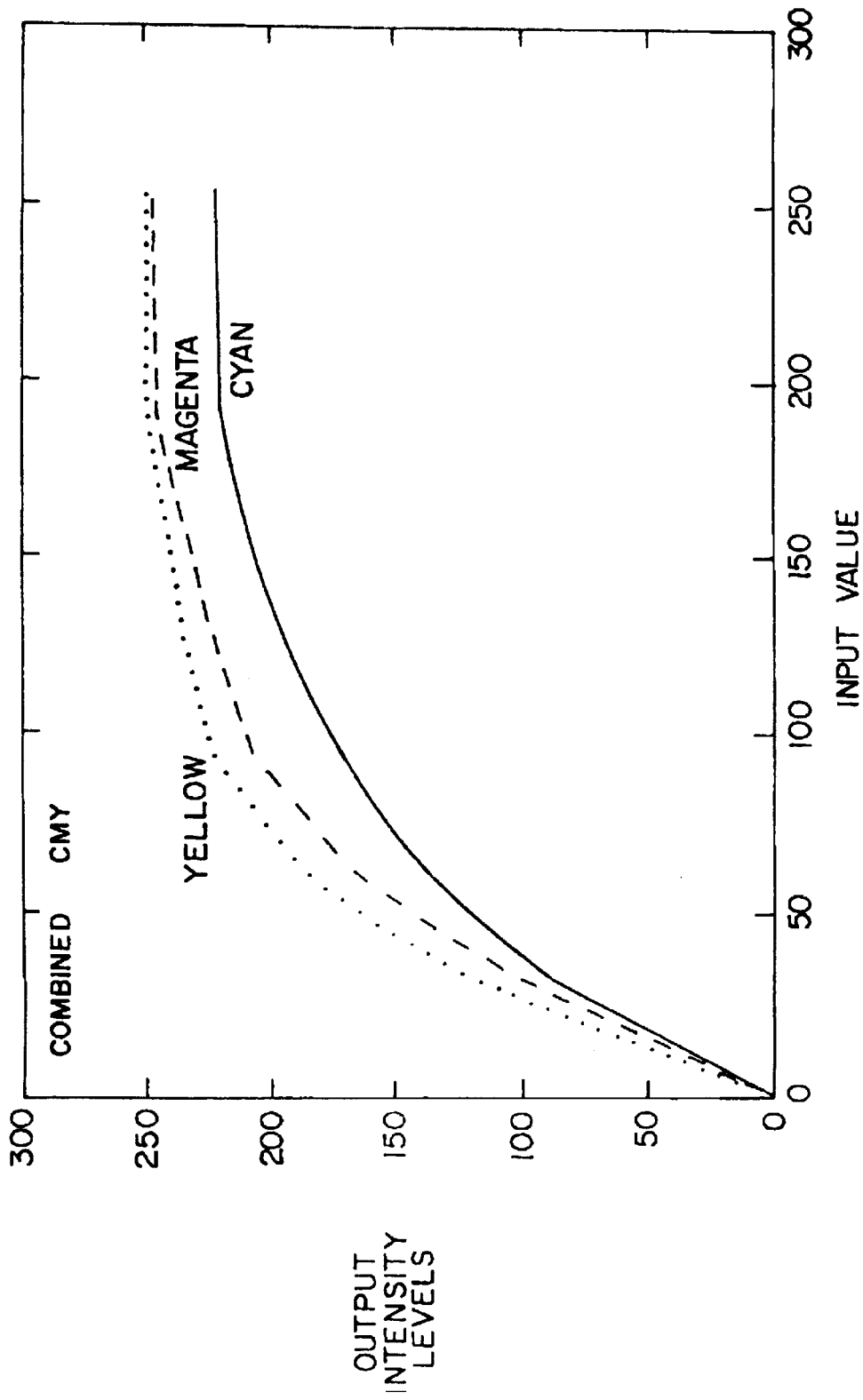
FIG. 4 is a graph illustrating a general relation between input values and output intensity values for cyan, magenta and yellow when the above three toner of FIGS. 1—3 are applied together.

After the converted and standardized CMYK values are obtained, the second γ correction unit 408 further corrects each color component to accommodate output characteristics. The output characteristics include the device variations as well as the toner variations as described in reference to FIGS. 1–4. As shown in FIG. 4, generally, the yellow and magenta output intensity values are higher than the corresponding yellow value. One way to balance this color imbalance due to the toner characteristics is to adjust the yellow and magenta values to the cyan value so that the color components of an output image are substantially color balanced. To accomplish the above described color balancing task, the second γ correction unit 408 reduces the yellow and magenta values to approximately 70 to 80 percent of their respective input values. Since the color balance is delicately adjusted and at least two color components of the image information must be corrected, the second γ correction unit 408 must flexibly and efficiently performs the above described second correction.

To further describe some of the above γ correction related components in FIGS. 5 and 6, the operations performed by these components are explained below. Original Bezier curves are drawn based upon the following equation (1):

$$B=P_0(1-t)^3+3P_1(1-t)^2t+3P_2(1-t)t^2+P_3t^3$$

where B is an output point, P's are tangential control points, and t is a variable ranging between 0 and 1. The above tangential points are each specified by a pair of the x and y coordinates. $P_0$ is a starting point of the Bezier curve while $P_3$ is an ending point of the same curve. The Bezier curve, however, is fixed by the tangential points and is not generally flexible.

Figure 7:
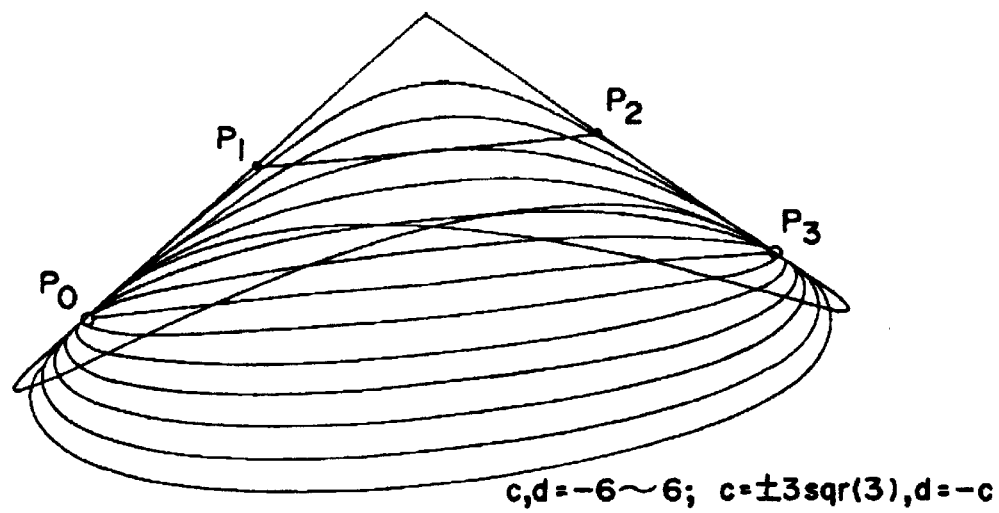
FIG. 7 illustrates an example of the Murayama-Bezier (MB) curves.

Referring to FIG. 7, examples of the Murayama-Bezier (MB) curve are illustrated to show flexibilities of the method and the system according to the current invention. As disclosed in Japanese Patent Publication No. 2-222264, the above described Bezier equation is further modified to generate further flexibility in the curve. This modified Bezier equation also known as Murayama-Bezier equation is defined as follows:

$$MB(t)=P_0(1-t)^3+\{cP_1-(c-3)P_0\}(1-t)^2t+\{dP_2-(d-3)P_3\}(1-t)t^2+P_3t^3 \quad (2)$$

where P's and t are the same as defined for the equation (1). c and d are additional parameters that respectively specify an additional slope of the curve. c specifies a first slope of the curvature from $P_1$ to $P_2$ while d specifies a second slope of the curvature from $P_2$ to $P_3$. The MB curves as shown in FIG. 7 have been generated with c and d ranging between –6 and 6. c=±3 sqr(3) while d=–c. In general, with the fixed $P_0$–$P_3$, as the parameters c and d become larger, the MB curve increases its curvature. On the other hand, as the parameter c and d become smaller, the MB curve decreases its curvature.

Figure 8:
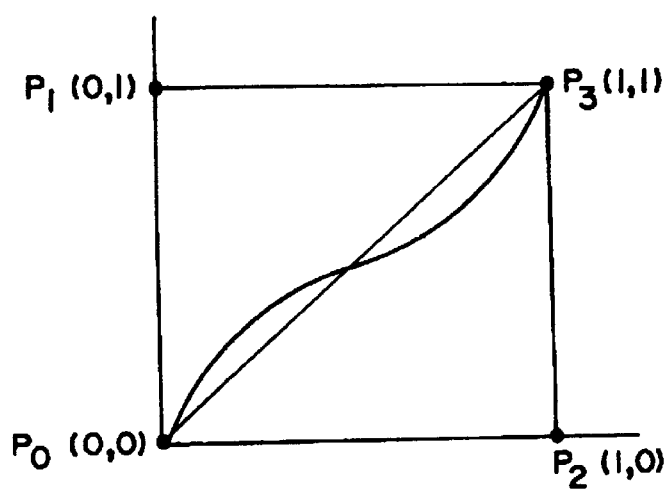
FIG. 8 illustrates the MB curve expressed in y in terms of a function of x when the four points on the curve are defined as (0,0), (0,1), (1,0) and (1,1).

The above described MB curve as expressed by the equation (2) may be redrawn on the x-y coordinate based upon the control tangential points having the x and y values. However, for each t, a pair of x and y values must be calculated and cannot be easily correlated as a correction curve. To convert the above equation (2) into a function in terms of x (i.e. y=f(x)), the points $P_0$, $P_1$, $P_2$ and $P_3$ are assumed to be (0,0); (0,1); (1,0) and (1,1) as shown in FIG. 8, and the equation (2) is first expressed as a function of t. Since the desired function is y=f(x), the y coordinates of the above assumed points are used and t is then replaced by x as expressed by the following equation (3).

$$y=c(x-1)^2x+(3-d)(x-1)x^2+x^3 \quad (3)$$

where $0 \leq x \leq 1$ and $0 \leq y \leq 1$. One example of the MB curve based upon the above equation (3) is illustrated in FIG. 8. Generally, the MB curve has a S-shape and provides a more flexible correction capability.

According one aspect of the current invention, the above described parameters c and d are further defined as follows so that the above equation (3) becomes the polynomial of the fifth degree:

$$c=c_1+c_2(x-x_2)(x-x_4) \quad (4)$$

$$d=d_1+d_2(x-x_2)(x-x_4) \quad (5)$$

Without the above definitions of the parameters c and d, if the parameters c and d are defined as constants, the equation (3) is an only cubic polynomial. Additional parameters $c_1$, $c_2$, $d_1$ and $d_2$ in the equations (4) and (5) are further defined by three points that are situated between an beginning point $(x_1, y_1)=(0, 0)$ and the ending point $(x_5, y_5)=(1, 1)$ of the MB curve. Assuming that these three points on the MB curve are specified by $(x_2, y_2)$; $(x_3, y_3)$ and $(x_4, y_4)$, the above additional parameters $c_1$, $c_2$, $d_1$ and $d_2$ are defined by the following equations (6), (7) and (8):

$$c_1 = \frac{x_2 x_4}{(1-x_2)(1-x_4)} + \frac{-y_2(1-x_4)x_4^2 + y_4(1-x_2)x_2^2}{x_2 x_4 (1-x_2)(1-x_4)(x_2-x_4)}$$

$$d_1 = 3 + \frac{x_2+x_4-x_2 x_4}{(1-x_2)(1-x_4)} + \frac{-y_2(1-x_4)^2 x_4 + y_4(1-x_2)^2 x_2}{x_2 x_4 (1-x_2)(1-x_4)(x_2-x_4)}$$

$$c_2 - d_2 = \frac{y_3}{(x_3-x_2)(x_3-x_4)(1-x_3)^2 x_3} - \frac{c_1}{(x_3-x_2)(x_3-x_4)} - \frac{(3-d_1)x_3}{(x_3-x_2)(x_3-x_4)(1-x_3)} - \frac{x_3^2}{(x_3-x_2)(x_3-x_4)(1-x_3)^2}$$

Although $c_2$ and $d_2$ cannot be independently defined, selected values of $c_2$ and $d_2$ determine the MB curve characteristics and $c_2$–$d_2$ is defined as above. In addition, since $y_2$ and $y_4$ can be smaller than 0 or larger than 1, in the strict sense, the MB curve as used a correction curve for the purpose of this invention is further defined by limiting the above equation (3) as follows:

$$y \geq \begin{cases} 0 & ; y \leq 0 \\ c(x-1)^2 x + (3-d)(x-1)x^2 + x^3 & ; 0 \leq y \leq 1 \\ 1 & ; y < 1 \end{cases} \quad (9)$$

Thus, as defined by the above equations (3)–(9), the MB curve as used as a γ correction curve is efficiently and flexibly selected by specifying the parameters $c_2$ and $d_2$ as well as the three points $(x_2, y_2)$; $(x_3, y_3)$ and $(x_4, y_4)$ on the curve. The three paris of the above parameters generally determine the shape of the γ correction curve while the fourth parameter pair of $c_2$ and $d_2$ further adjusts certain curvatures. Thus, these four pairs of the parameters generally define a parameter set.

Figure 9:
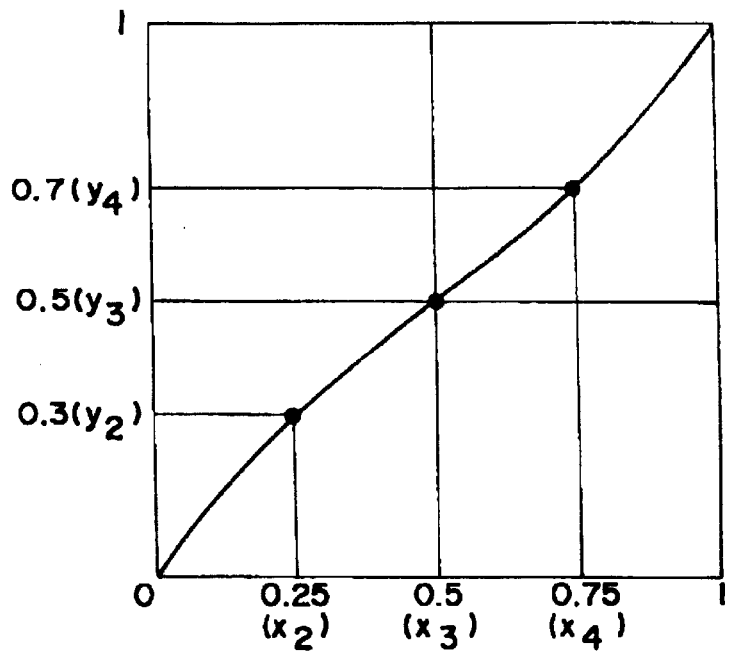
FIG. 9 is a first example of the MB curve expressed in the x-y coordinate when $d_2=0$ according to the current invention.
Figure 10:
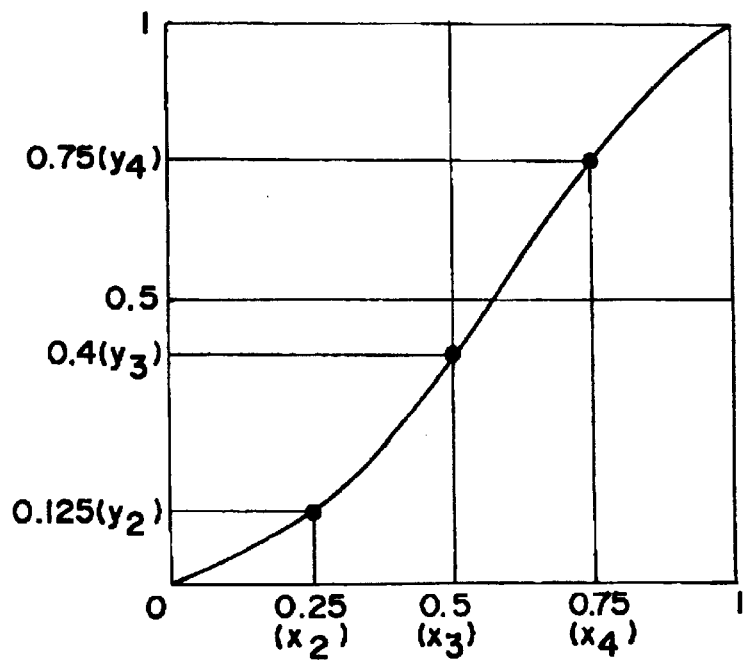
FIG. 10 is a second example of the MB curve when $d_2=0$.

Now referring to FIGS. 9 and 10, some examples of the γ correction curve are illustrated for the use with the current invention. In these examples, the upper right portion of the x-y coordinate is generally referred to as a shadow region while the lower left portion as a highlight region. Since the output values in the shadow region is larger, the corresponding output image appears darker than that in the highlight region. FIG. 9 illustrates a γ correction curve that is generated base upon a parameter set specifying $(x_2, y_2)=(0.25, 0.3)$; $(x_3, y_3)=(0.5, 0.5)$ and $(x_4, y_4)=(0.75, 0.7)$ and $d_2=0$. FIG. 10 illustrates another γ correction curve that is generated base upon a parameter set specifying $(x_2, y_2)=(0.25, 0.125)$; $(x_3, y_3)=(0.5, 0.4)$ and $(x_4, y_4)=(0.75, 0.75)$ and $d_2=0$. When these two γ correction curves are used to correct the same image information data, the γ correction curve as shown in FIG. 9 generates an output image that has enhanced values in the highlight region. On the other hand, the correction curve as shown in FIG. 10 generates an output image that has enhanced values in the shadow region. As described above, these examples of the γ correction curve determine certain predetermined aspects of the output image.

Figure 11:
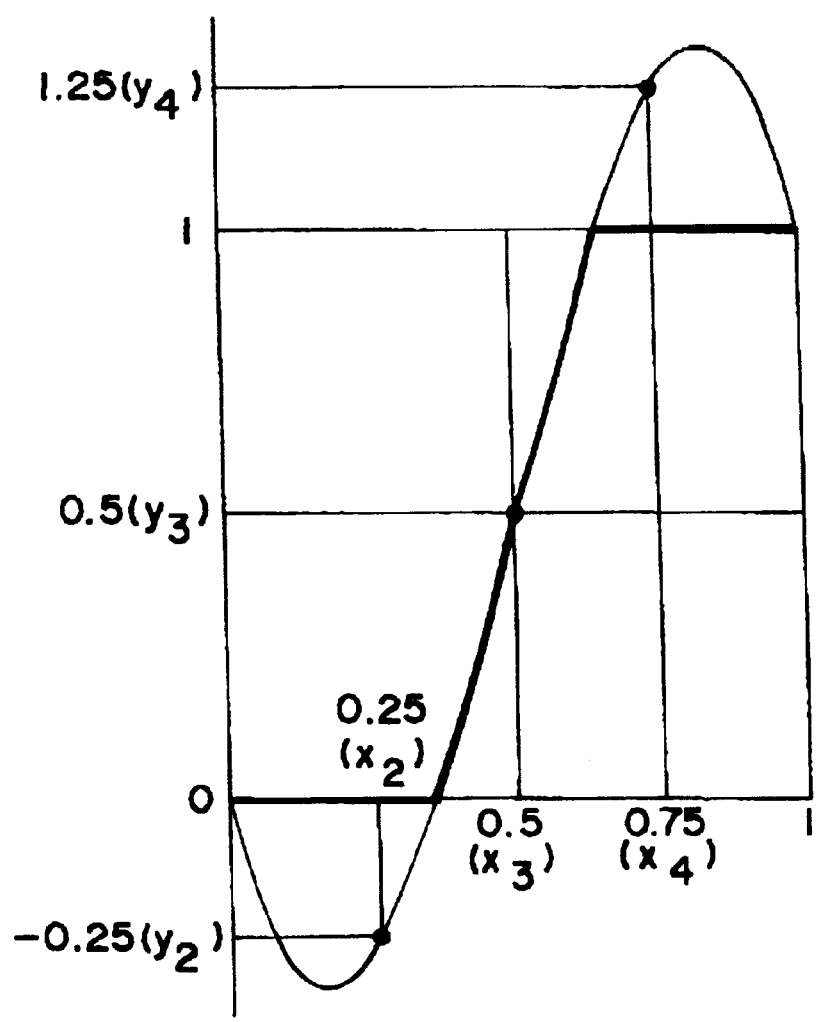
FIG. 11 is a third example of the MB curve when $d_2 0$.

FIG. 11 illustrates a yet another example of the γ correction curve according to the current invention. The γ correction curve is generated base upon a parameter set specifying $(x_2, y_2)=(0.25, -0.25)$; $(x_3, y_3)=(0.5, 0.5)$ and $(x_4, y_4)=(0.75, 1.25)$ and $d_2=0$. This γ correction curve appears to correct image information in an almost binary manner and is useful for a certain image output such as a character. This is because, in general, a character image requires a sharp contrast along its edges, and such a sharp contrast provides great appearance. However, since the y value is not within the standard corrected range ($0 \leq y \leq 1$), an additional cut-off process must be performed.

Figure 12:
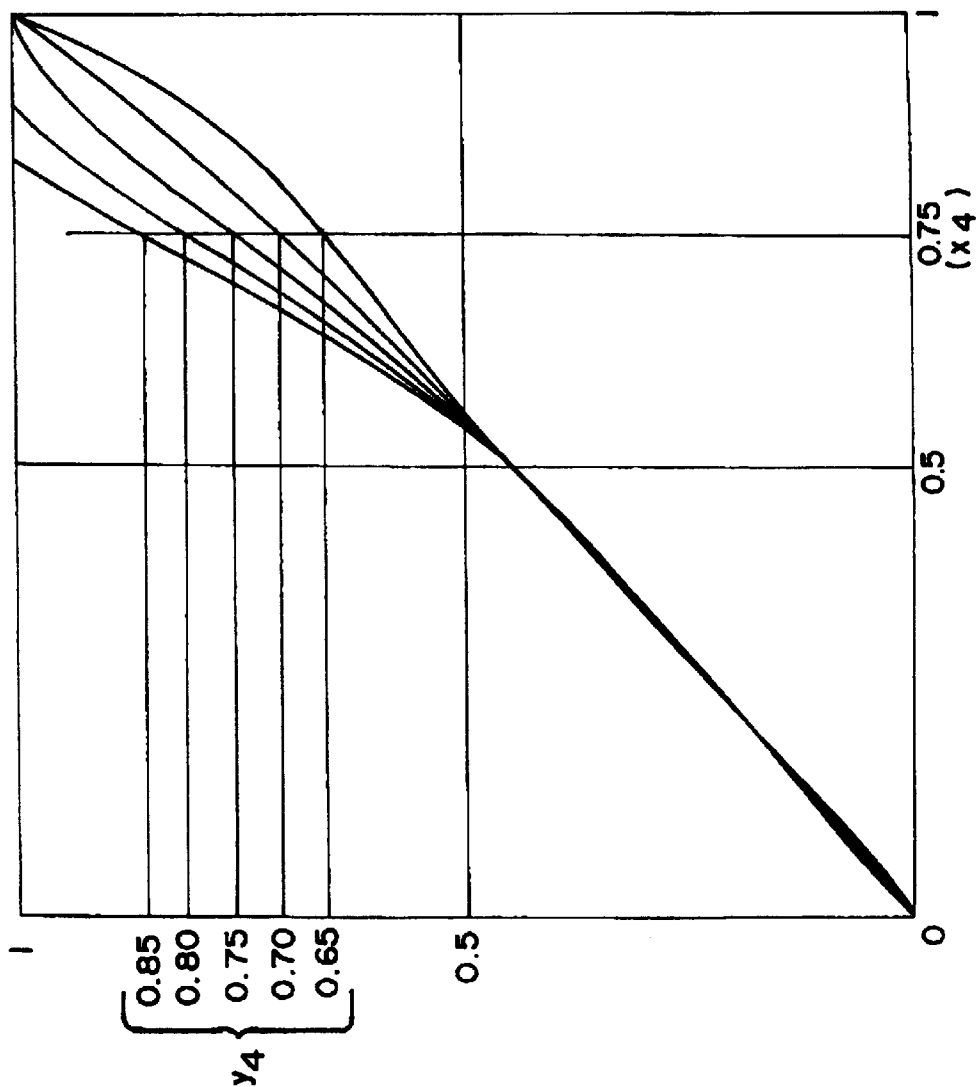
FIG. 12 is a fourth example of the MB curve when $c_2=0$ and $y_4$ is adjusted at $x_4=0.75$.
Figure 13:
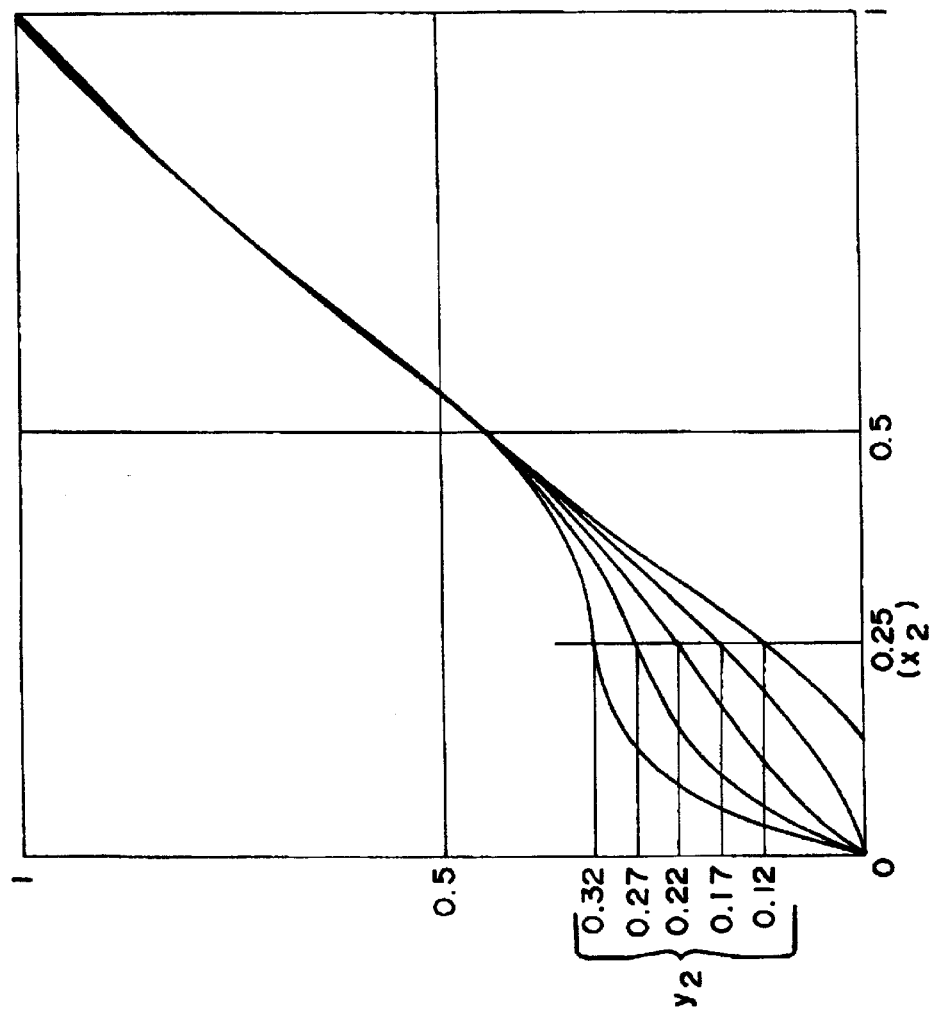
FIG. 13 is a fifth example of the MB curve when $d_2 0$ and $y_2$ is adjusted at $x_2=0.25$.
Figure 14:
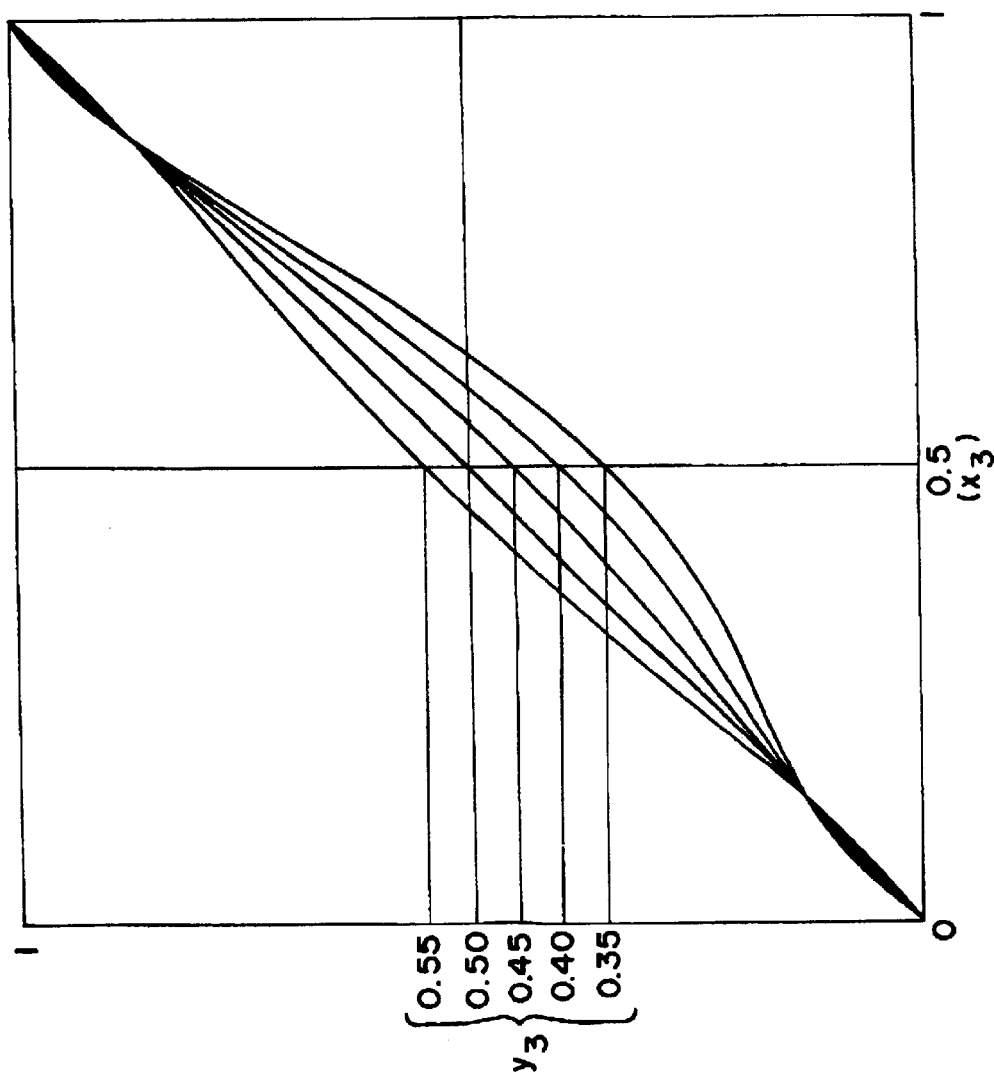
FIG. 14 is a sixth example of the MB curve when $y_3$ is adjusted at $x_3=0.5$.

In addition to the above described adjustments to the γ correction curve, referring to FIGS. 12, 13 and 14, according to a second embodiment of the current invention, a second type of adjustments is made to a localized portion of the existing γ correction curve with substantially minimal affects on other parts of the MB curve. The γ correction curve as shown in FIG. 12 has been originally generated based upon a parameter set specifying $(x_2, y_2)=(0.25, 0.22)$; $(x_3, y_3)=(0.5, 0.45)$ and $(x_4, y_4)=(0.75, 0.75)$ and $c_2=0$. The γ correction curve at $x_4=0.75$ has been further adjusted by changing the $y_4$ value between 0.65 and 0.85 with a step of 0.05 as shown in FIG. 12. As a result, the adjusted γ correction curve has five branching lines only in the shadow region without affecting its curve in the highlight region. Among other things, the above described refined and independent adjustments in the localized shadow region are applied to control subtle colors such as shades of dark hair color in a human picture.

Now referring to FIG. 13, by the same token, the existing γ correction curve has been modified in the localized highlight region. The e correction curve as shown in FIG. 13 has been originally generated base upon a parameter set specifying $(x_2, y_2)=(0.25, 0.22)$; $(x_3, y_3)=(0.5, 0.45)$ and $(x_4, y_4)=(0.75, 0.75)$ and $d_2=0$. The γ correction curve at $x_2=0.25$ has been further adjusted by changing only the $y_2$ value between 0.12 and 0.32 with a step of 0.05 as shown in FIG. 13. As a result, the adjusted γ correction curve has five branching lines only in the highlight region without affecting its curve in the shadow region. Among other things, the above described refined and independent adjustments in the localized highlight region are applied to control subtle colors such as shades of a skin color.

In addition to the refined adjustments in either the shadow or highlight region, an existing γ correction curve may be also independently adjusted in any specified region as shown in FIG. 14. The γ correction curve has been originally generated base upon a parameter set specifying $(x_2, y_2)= (0.125, 0.122)$; $(x_3, y_3)=(0.5, 0.45)$ and $(x_4, y_4)=(0.875, 0.875)$ and $d_2=-c_2$. The γ correction curve has been further adjusted at $x_3=0.5$ by changing only the $y_3$ value between 0.35 and 0.55 with a step of 0.05. As a result, the adjusted γ correction curve has five branching lines in the area between the highlight and the shadow regions.

In the above examples of the γ correction curve, the input and output values are standardized and limited between 0 and 1. However, the scanners and the printers generally have a value range different from the above standardized range. For example, a scanner with a six-bit input signal has an input range between 0 and 63 or 64 input levels. Another example is that a printer with an eight-bit output signal has an output range between 0 and 255 or 256 output levels. In order to convert a value between the two ranges, according to one preferred method of the current invention, the following equation (10) is used:

$$y'=a+b\,y \quad (0 \leq x,\ y \leq 5\,1) \tag{10}$$

where y is the value obtained by the above described γ correction process and y' is a converted or adjusted value. Since a and b are some constants and $0 \leq y \leq 1$, the converted y' value ranges between a and a+b. Thus, by selecting appropriate values for a and b, this conversion method allows a γ corrected value to be further adjusted to a desired value. One application of the above conversion is to convert the γ corrected standard values to device dependent values or vice versa as will be described later. Another application is to further convert the γ corrected value to a color-specific value so that the repetitive γ correction process for each color is substantially eliminated.

Figure 15A:
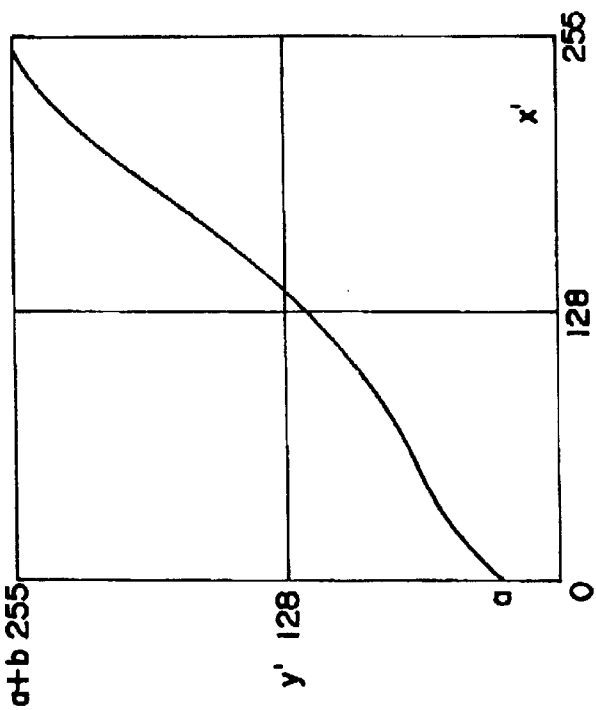
FIGS. 15A and 15B respectively illustrate a MB curve and its adjusted curve according to an equation $y'=a+$ by of the current invention.
Figure 15B:
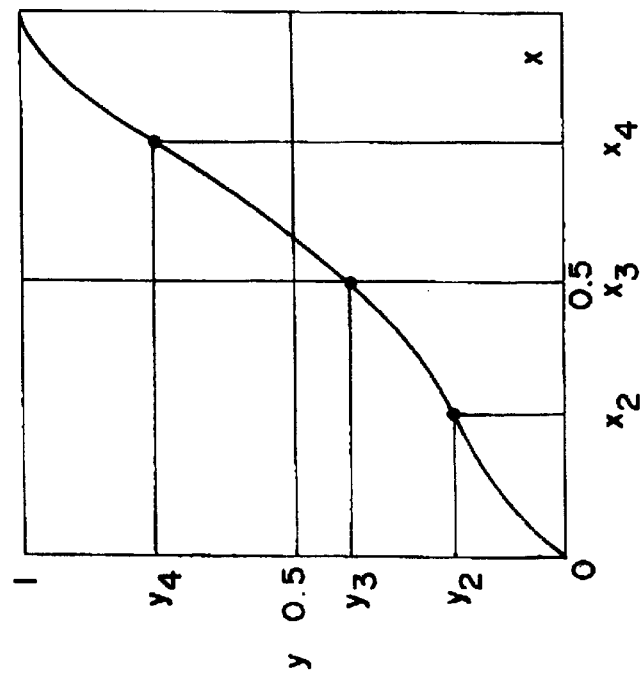

Using the above conversion method, a γ correction curve is further adjusted as shown in FIGS. 15A and 15B. The γ correction curve as shown in FIG. 15A has the input as well as output range between 0 and 1 and is in part specified by the three points $(x_2, y_2)$; $(x_3, y_3)$ and $(x_4, y_4)$. However, for example, as shown in FIG. 15B, the range is easily changed to another range between 0 and 255 based upon the above equation (10). In FIG. 15B, at $x'=0$, $y'=a$ while at $x'=255$, $y'=a+b$ or 255.

According to the above described preferred methods of the current invention, a γ correction curve is generated based upon desired characteristics and is further modified after its generation. Certain combinations of the above described methods are appropriate to practice the current invention, and they are performed by predetermined components of the system according to the current invention. In particular, the relevant system components include the software program and the CPU 100 as described in reference to FIG. 5 as well as the γ correction unit 403 as described with respect to FIG. 6. The first γ correction unit 405 and the second γ correction unit 408 may be each implemented as a separate dedicated hardware or a general independent micro processor running a specific software program.

Figure 16:
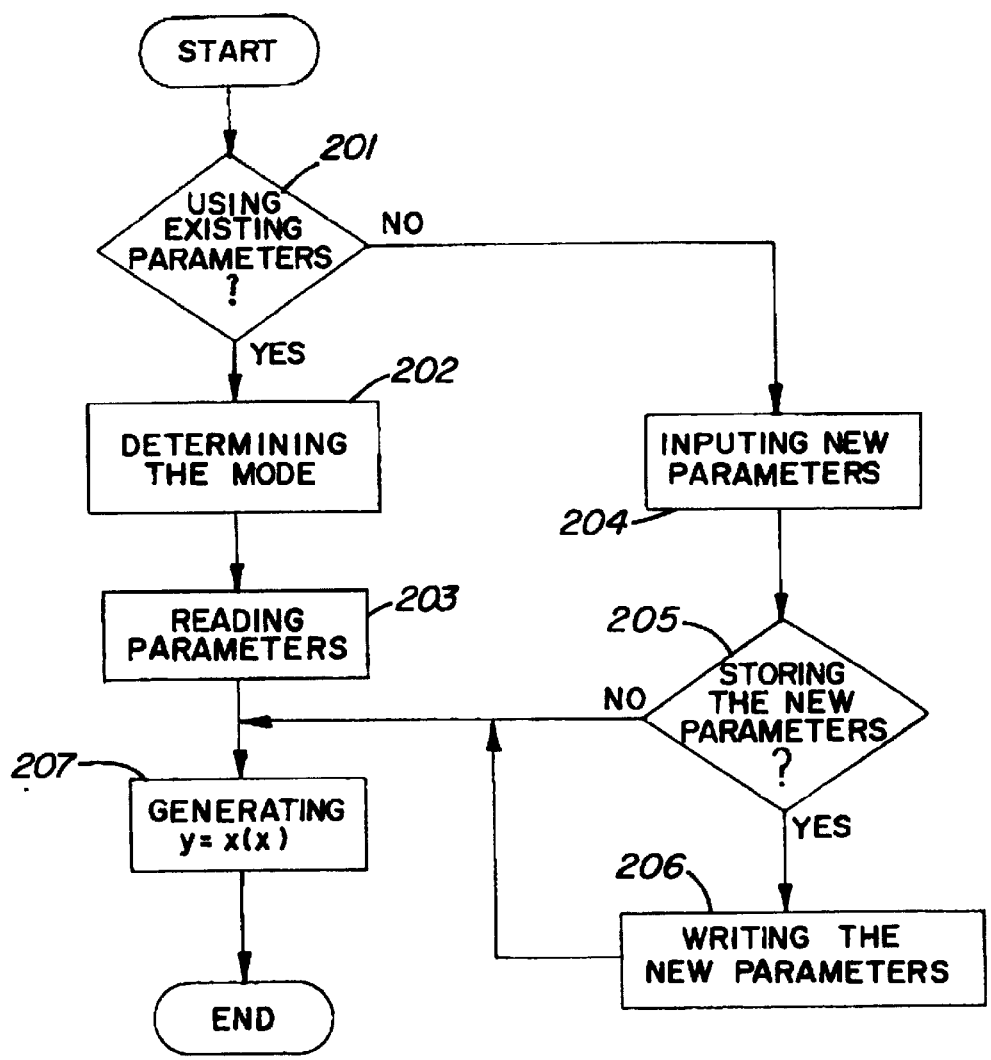
FIG. 16 is a flow chart illustrating a flow of certain aspects of the system according to the current invention.

Referring to FIG. 16, certain steps related to the above described γ correction are described in a flow chart. In order to generate a desired γ correction curve, in a step 201, a user has to decide whether to use an existing parameter set or a new parameter set. When a new parameter set is to be used, the user has to input new parameter values in a step 204. Additionally, the user also has to specify whether or not the new parameter set is saved in the system in a step 205. If the decision in the step 205 is positive, the new parameter set is stored in a step 206. On the other hand, when an existing parameter set is used, the user must specify a desired parameter set or a mode in a step 202. For example, the mode may be selected from the list of "standard," "brighter," "darker" and "character." Each of these modes corresponds to a particular parameter set which contains predetermined values. A selected parameter set is read from parameter memory in a step 203. At this point, regardless of the source of the selected parameter set, a γ correction curve is generated based upon a predetermined gamma correction function and the selected parameter set values in a step 207. In the step 207, more concretely, using the above described equations (6), (7) and (8), $c_1$, $c_2$, $d_1$ and $d_2$ are first obtained. After c and d are determined by the above equations (4) and (5), the γ correction curve over the standardized range between 0 and 1 is generated by substituting the c and d values into the equation (3). It is also the step 207 where the above described cut off process takes place if $0 \leq y \leq 1$ is not satisfied. Although FIG. 16 does not show any other steps, the γ correction curve obtained in the step 207 may be stored with the corresponding parameter set for the future use. Furthermore, based upon the above modified storage, the γ correction curves may be later displayed for selection in lieu of the parameter sets or the modes in step 202, and the curve generation step 207 is eliminated.

Figure 17:
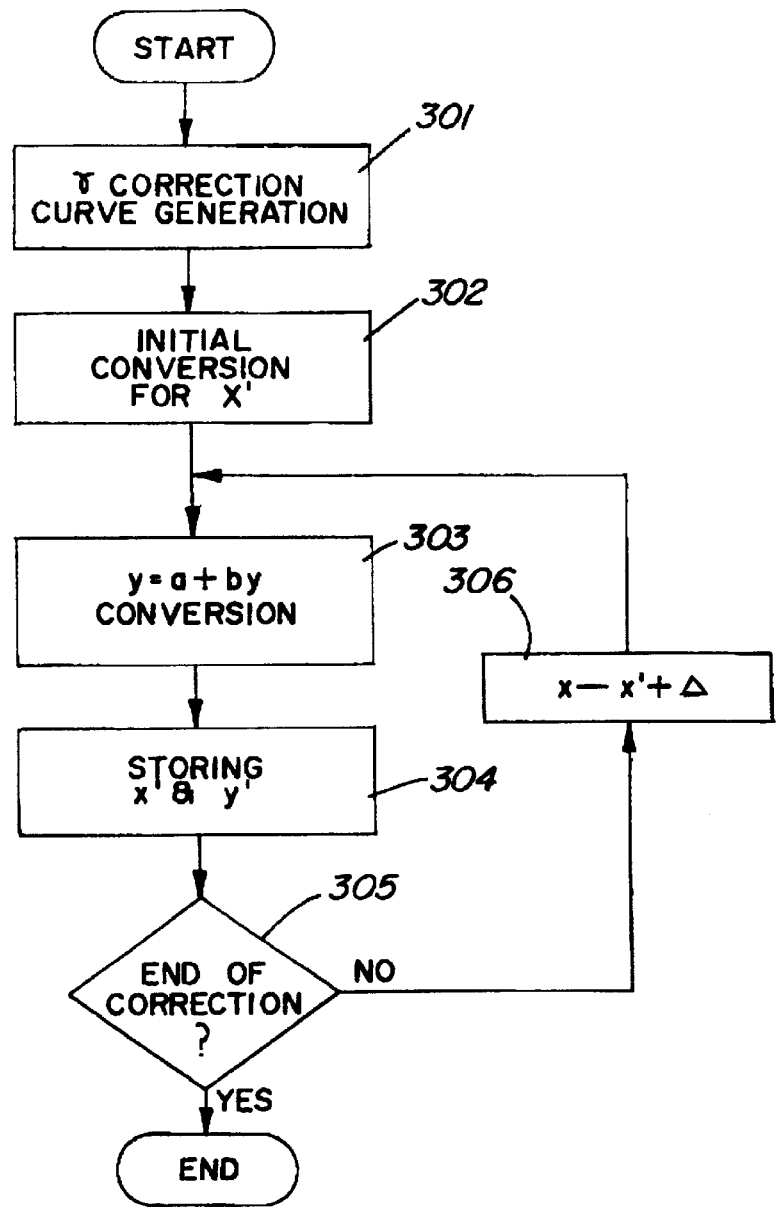
FIG. 17 is a flow chart illustrating a flow of certain other aspects of the system according to the current invention.

Referring to FIG. 17, after the γ correction curve is generated over the standard range in a step 301, the corrected values may be converted to appropriate values for a particular device. To convert the standard values to the device-dependent values, a conversion table may be prepared in advance. In a step 302, one device-dependent input value x' is considered at a time, and the x' value is initialized to 0 at the beginning of the table generation. In a step 303, the device-dependent value is obtained based upon the above described equation (10). After a pair of x' and y' values is written in the conversion table in a step 304, it is determined whether the conversion process has already processed the highest device-dependent input value in a step 305. If the highest value has not reached, the device-dependent value is incremented by one predetermined step increment value Δ in a step 306, and the above described steps 303 and 304 are repeated. On the other hand, if the conversion process has reached the highest input value, the conversion process terminates.

In summary, according to one preferred embodiment, the steps of the above described γ correction methods are performed on the fly as the corrected values are generated. Because of this, generally, large memory is not necessary for tables for the pre-calculated image information. Furthermore, because of the on-the-fly calculations, the γ correction is independently performed for each component of the color scheme using a color-specific γ correction curve.

According to another preferred embodiment, certain aspects of the above described γ correction methods allow localized and refined intensity corrections while certain other aspects allow flexible conversion between two different ranges. These refined adjustments are especially useful in modifying the delicate color balance. In addition, the above described image correction is also useful for fine-tuning the changes in the I/O device characteristics over the course of long use.

Lastly, according to yet another embodiment of the current invention, the corrected image information data as well as parameter sets are stored.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of converting color information from one color system to another color system for outputting a color image, comprising the steps of:

a) converting first values respectively representing a first set of colors into second values respectively representing a second set of colors based upon a gamma correction function which is expressed by a general equation y=f(x) and generates a gamma correction curve, an input value x and an output value y satisfying the following conditions, $0 \leq x \leq 1$ and $0 \leq y \leq 1$; and b) further converting each of said second values into an adjusted second value based upon a color specific function, said output value y being further modified by a second equation y'=a+b·y where y'=a when x=0 and y'=a+b when x=1 wherein a localized portion of said gamma correction curve being independently modified, said adjusted second value enhancing the output image on an image carrying medium.

2. The method of converting color information according to claim 1 wherein said gamma correction function is expressed by an equation, $y=c(x-1)^2 x+(3-d)(x-1) x^2+x^3$, where x is an input variable having particular values $x_1$, $x_2$, $x_3$, $x_4$ and $x_5$ and $x_1 < x_2 < x_3 < x_4 < x_5 (x_1=0, x_5=1)$ while y is an output variable having corresponding particular values $y_1$, $y_2$, $y_3$, $y_4$ and $y_5$ ($y_1=0$, $y_5=1$), c and d being a constant and defined by $c=c_1+c_2(x-x_2)(x-x_4)$, $d=d_1+d_2(x-x_2)(x-x_4)$ where $$c_1 = \frac{x_2 x_4}{(1-x_2)(1-x_4)} + \frac{-y_2(1-x_4)x_4^2 + y_4(1-x_2)x_2^2}{x_2 x_4 (1-x_2)(1-x_4)(x_2-x_4)}$$

$$d_1 = 3 + \frac{x_2+x_4-x_2 x_4}{(1-x_2)(1-x_4)} + \frac{-y_2(1-x_4)^2 x_4 + y_4(1-x_2)^2 x_2}{x_2 x_4 (1-x_2)(1-x_4)(x_2-x_4)}$$

$$c_2 - d_2 = \frac{y_3}{(x_3-x_2)(x_3-x_4)(1-x_3)^2 x_3} - \frac{c_1}{(x_3-x_2)(x_3-x_4)} - \frac{(3-d_1)x_3}{(x_3-x_2)(x_3-x_4)(1-x_3)} - \frac{x_3^2}{(x_3-x_2)(x_3-x_4)(1-x_3)^2}.$$

3. The method of converting color information according to claim 2 wherein said output value y is further modified by a second equation y'=a+b·y where y'=a when x=0 and y'=a+b when x=1.

4. The method of converting color information according to claim 1 wherein said color specific function is a gamma correction function for each of said second set of said colors, said gamma correction function being expressed by a general equation y=f(x), x and y satisfying the following conditions, $0 \leq x \leq 1$ and $0 \leq y \leq 1$.

5. The method of converting color information according to claim 4 wherein said output value y is further modified by a second equation y'=a+b·y where y'=a when x=0 and y'=a+b when x=1.

6. The method of converting color information according to claim 4 wherein said gamma correction function is expressed by an equation, $y=c(x-1)^2 x+(3-d)(x-1) x^2+x^3$, where x is an input variable having particular values $x_1$, $x_2$, $x_3$, $x_4$ and $x_5$ and $x_1 < x_2 < x_3 < x_4 < x_5$ ($x_1=0$, $x_5=1$) while y is an output variable having corresponding particular values $y_1$, $y_2$, $y_3$, $y_4$ and $y_5$ ($y_1=0$, $y_5=1$), c and d being a constant and defined by $c=c_1+C_2(x-x_2)(x-x_4)$, $d=d_1+d_2(x-x_2)(x-x_4)$ where $$c_1 = \frac{x_2 x_4}{(1-x_2)(1-x_4)} + \frac{-y_2(1-x_4)x_4^2 + y_4(1-x_2)x_2^2}{x_2 x_4 (1-x_2)(1-x_4)(x_2-x_4)}$$

$$d_1 = 3 + \frac{x_2+x_4-x_2 x_4}{(1-x_2)(1-x_4)} + \frac{-y_2(1-x_4)^2 x_4 + y_4(1-x_2)^2 x_2}{x_2 x_4 (1-x_2)(1-x_4)(x_2-x_4)}$$

-continued $$c_2 - d_2 = \frac{y_3}{(x_3 - x_2)(x_3 - x_4)(1 - x_3)^2 x_3} - \frac{c_1}{(x_3 - x_2)(x_3 - x_4)} - \frac{(3 - d_1)x_3}{(x_3 - x_2)(x_3 - x_4)(1 - x_3)} - \frac{x_3^2}{(x_3 - x_2)(x_3 - x_4)(1 - x_3)^2}.$$

7. The method of converting color information according to claim 6 wherein said output value y is further modified by a second equation y'=a+b·y where y'=a when x=0 and y'=a+b when x=1.

8. The method of converting color information according to claim 6 where said step b) further includes an additional step of writing said x and y' values in a table.

9. The method of converting color information according to claim 6 where said step a) further includes an additional step of selecting parameters for said gamma correction function.

10. The method of converting color information according to claim 9 wherein said parameters are selected from predetermined values stored in a memory.

11. The method of converting color information according to claim 9 wherein said parameters are inputted by an operator.

12. The method of converting color information according to claim 11 wherein said inputted parameters are added in said memory.

13. A method of generating an intensity conversion table on the fly based upon a correction function for outputting an image, comprising the steps of:

a) providing an intensity input value x;

b) converting said intensity input value x into an intensity output value y based upon a gamma correction function for generating a gamma correction curve, said gamma correction function being expressed by an equation, $y=c(x-1)^2 x+(3-d)(x-1) x^2 + x^3$, where x has particular values $x_1, x_2, x_3, x_4$ and $x_5$ and $x_1 < x_2 < x_3 < x_4 < x_5$ ($x_1=0$, $x_5=1$) while y corresponds to particular values $y_1, y_2, y_3, y_4$ and $y_5$ ($y_1=0$, $y_5=1$), c and d being a constant and defined by $c=c_1+c_2(x-x_2)(x-x_4)$, $d=d_1+d_2(x-x_2)(x-x_4)$ where $$c_1 = \frac{x_2 x_4}{(1 - x_2)(1 - x_4)} + \frac{-y_2(1 - x_4)x_4^2 + y_4(1 - x_2)x_2^2}{x_2 x_4 (1 - x_2)(1 - x_4)(x_2 - x_4)}$$

$$d_1 = 3 + \frac{x_2 + x_4 - x_2 x_4}{(1 - x_2)(1 - x_4)} + \frac{-y_2(1 - x_4)^2 x_4 + y_4(1 - x_2)^2 x_2}{x_2 x_4 (1 - x_2)(1 - x_4)(x_2 - x_4)}$$

$$c_2 - d_2 = \frac{y_3}{(x_3 - x_2)(x_3 - x_4)(1 - x_3)^2 x_3} - \frac{c_1}{(x_3 - x_2)(x_3 - x_4)} - \frac{(3 - d_1)x_3}{(x_3 - x_2)(x_3 - x_4)(1 - x_3)} - \frac{x_3^2}{(x_3 - x_2)(x_3 - x_4)(1 - x_3)^2}.$$

y satisfying the following condition, $0 \leq y \leq 1$; and c) further modifying said intensity output value y to y' based upon a second equation y'=a+b·y where y'=a when x=0 and y'=a +b when x=1, wherein a localized portion of said gamma correction curve being independently modified.

14. A system for converting color information from one color system to another color system for outputting a color image, comprising:

a first converter for converting first values respectively representing a first set of colors into second values respectively representing a second set of colors based upon a common function, said second converter performing a color specific function using a gamma correction function for each of said second set of said colors, said gamma correction function being expressed by a general equation y=f(x), x and y satisfying the following conditions, $0 \leq x \leq 1$ and $0 \leq y \leq 1$ said second converter further modifying said output value y to obtain a final output value y' by performing a second equation as defined as y'=a+b·y where y'=a when x=0 and y'=a+b when x=1, wherein a localized portion of and gamma correction curve being independently modified; and a second converter connected to said first converter for further converting each of said second values into an adjusted second value based upon a color specific function, said adjusted second value enhancing the output image on an image carrying medium.

15. The system for converting color information according to claim 14 wherein said first converter performs said common function using a gamma correction function, said gamma correction function being expressed by a general equation y=f(x), x and y satisfying the following conditions, $0 \leq x \leq 1$ and $0 \leq y \leq 1$.

16. The system for converting color information according to claim 15 wherein said first converter further modifies said output value y to obtain a final value y' by performing a second function as defined by y'=a+b·y where y'=a when x=0 and y'=a+b when x=1.

17. The system for converting color information according to claim 15 wherein said first converter performs said gamma correction function which is expressed by an equation, $y=c(x-1)^2 x+(3-d)(x-1) x^2 + x^3$, where x is an input variable having particular values $x_1, x_2, x_3, x_4$ and $x_5$ and $x_1 < x_2 < x_3 < x_4 < x_5$ ($x_1=0$, $x_5=1$) while y is an output variable having corresponding particular values $y_1, y_2, y_3, y_4$ and $y_5$ ($y_1=0$, $y_5=1$), c and d being a constant and defined by $c=c_1+c_2(x-x_2)(x-x_4)$, $d=d_1+d_2(x-x_2)(x-x_4)$ where $$c_1 = \frac{x_2 x_4}{(1 - x_2)(1 - x_4)} + \frac{-y_2(1 - x_4)x_4^2 + y_4(1 - x_2)x_2^2}{x_2 x_4 (1 - x_2)(1 - x_4)(x_2 - x_4)}$$

$$d_1 = 3 + \frac{x_2 + x_4 - x_2 x_4}{(1 - x_2)(1 - x_4)} + \frac{-y_2(1 - x_4)^2 x_4 + y_4(1 - x_2)^2 x_2}{x_2 x_4 (1 - x_2)(1 - x_4)(x_2 - x_4)}$$

$$c_2 - d_2 = \frac{y_3}{(x_3 - x_2)(x_3 - x_4)(1 - x_3)^2 x_3} - \frac{c_1}{(x_3 - x_2)(x_3 - x_4)} - \frac{(3 - d_1)x_3}{(x_3 - x_2)(x_3 - x_4)(1 - x_3)} - \frac{x_3^2}{(x_3 - x_2)(x_3 - x_4)(1 - x_3)^2},$$

y satisfying the following condition, $0 \leq y \leq 1$.

18. The system for converting color information according to claim 17 wherein said first converter further modifies said output value y to obtain a final output value y' by performing a second equation as defined as y'=a+b·y where y'=a when x=0 and y'=a+b when x=1.

19. The system for converting color information according to claim 14 wherein said second converter performs said gamma correction function which is expressed by an equation, $y=c(x-1)^2 x+(3-d)(x-1) x^2 + x^3$, where x is an input variable having particular values $x_1, x_2, x_3, x_4$ and $x_5$ and $x_1 < x_2 < x_3 < x_4 < x_5$ ($x_1=0$, $x_5=1$) while y is an output variable having corresponding particular values $y_1, y_2, y_3, y_4$ and $y_5$ ($y_1=0$, $y_5=1$), c and d being a constant and defined by $c=c_1+c_2(x-x_2)(x-x_4)$, $d=d_1+d_2(x-x_2)(x-x_4)$ where $$c_1 = \frac{X_2 X_4}{(1-x_2)(1-x_4)} + \frac{-y_2(1-x_4)x_4^2 + y_4(1-x_2)x_2^2}{x_2 x_4(1-x_2)(1-x_4)(x_2-x_4)}$$

$$d_1 = 3 + \frac{x_2 + x_4 - x_2 x_4}{(1-x_2)(1-x_4)} + \frac{-y_2(1-x_4)^2 x_4 + y_4(1-x_2)^2 x_2}{x_2 x_4(1-x_2)(1-x_4)(x_2-x_4)}$$

$$c_2 - d_2 = \frac{y_3}{(x_3-x_2)(x_3-x_4)(1-x_3)^2 x_3} - \frac{c_1}{(x_3-x_2)(x_3-x_4)} - \frac{(3-d_1)x_3}{(x_3-x_2)(x_3-x_4)(1-x_3)} - \frac{x_3^2}{(x_3-x_2)(x_3-x_4)(1-x_3)^2}.$$

, y satisfying the following condition, $0 \leq y \leq 1$.

20. The system for converting color information according to claim 19 wherein said second converter further modifies said output value y to obtain a final output value y' by performing a second equation as defined as y'=a+b·y where y'=a when x=0 and y'=a+b when x=1.

21. The system for converting color information according to claim 18 further comprises a memory for storing said x and y' values.

22. The system for converting color information according to claim 14 further comprises a selector for selecting parameters for said gamma correction function.

23. The system for converting color information according to claim 22 wherein said selector allows an operator to input said parameters.

24. The system for converting color information according to claim 23 wherein said selector stores said inputted parameters.

25. A system for generating an intensity conversion table on the fly based upon a correction function for outputting an image, comprising:

a scanner for inputting an intensity input value x of an image;

a first converter for converting said intensity input value x into an intensity output value y based upon a gamma correction function, said gamma correction function being expressed by an equation, $y=c(x-1)^2 x+(3-d)(x-1)x^2+x^3$, where x is an input variable having particular values $x_1, x_2, x_3, x_4$ and $x_5$ and $x_1<x_2<x_3<x_4<x_5$ ($x_1=0$, $x_5=1$) while y is an output variable having corresponding particular values $y_1, y_2, y_3, y_4$ and $y_5$ ($y_1=0, y_5=1$), c and d being a constant and defined by $c=c_1+c_2(x-x_2)(x-x_4)$, $d=d_1+d_2(x-x_2)(x-x_4)$ where $$c_1 = \frac{X_2 X_4}{(1-x_2)(1-x_4)} + \frac{-y_2(1-x_4)x_4^2 + y_4(1-x_2)x_2^2}{x_2 x_4(1-x_2)(1-x_4)(x_2-x_4)}$$

$$d_1 = 3 + \frac{x_2 + x_4 - x_2 x_4}{(1-x_2)(1-x_4)} + \frac{-y_2(1-x_4)^2 x_4 + y_4(1-x_2)^2 x_2}{x_2 x_4(1-x_2)(1-x_4)(x_2-x_4)}$$

$$c_2 - d_2 = \frac{y_3}{(x_3-x_2)(x_3-x_4)(1-x_3)^2 x_3} - \frac{c_1}{(x_3-x_2)(x_3-x_4)} - \frac{(3-d_1)x_3}{(x_3-x_2)(x_3-x_4)(1-x_3)} - \frac{x_3^2}{(x_3-x_2)(x_3-x_4)(1-x_3)^2}$$

; and a second converter for further modifying said intensity output value y to y' based upon a second equation y'=a+b·y where y'=a when x=0 and y'=a+b when x=1, wherein a localized portion of said gamma correction curve being independently modified.

\* \* \* \* \*